FREQUENCY SYNTHESIZERS, INCLUDING PROVISIONS FOR THE PRECISE ELECTRICAL CONTROL OF A VARIABLE OSCILLATOR
Filed Jan. 17, 1966
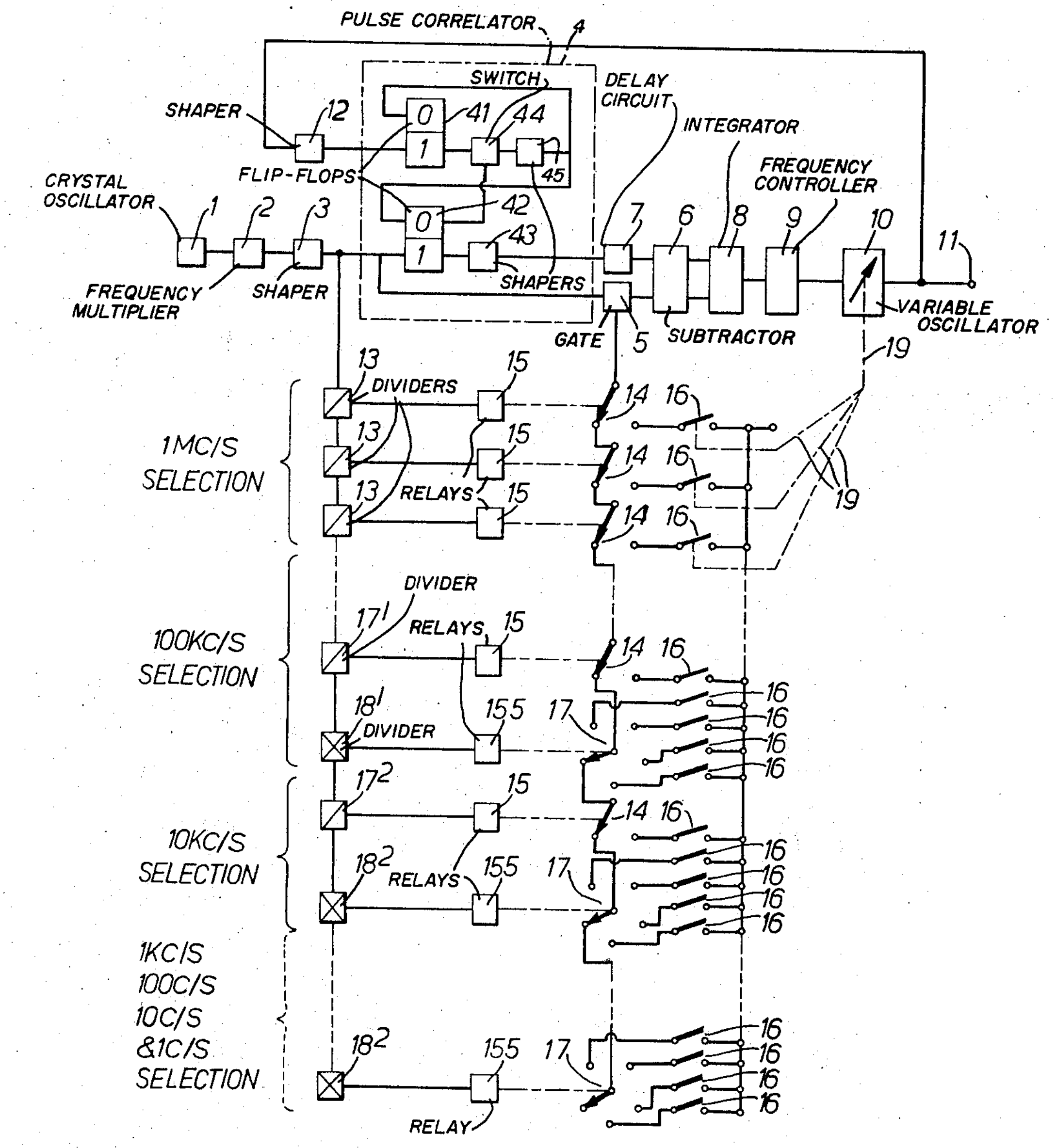
INVENTOR
Boleslaw Marian Sosin
BY
Baldwin & Wight
ATTORNEYS United States Patent Office 3,349,338

Patented Oct. 24, 1967

3,349,338

FREQUENCY SYNTHESIZERS INCLUDING PROVISIONS FOR THE PRECISE ELECTRICAL CONTROL OF A VARIABLE OSCILLATOR

Boleslaw Marian Sosin, Chelmsford, England, assignor to The Marconi Company Limited, London, England, a British company Filed Jan. 17, 1966, Ser. No. 520,933
Claims priority, application Great Britain, Feb. 3, 1965, 4,768/65
5 Claims. (Cl. 331—18)

ABSTRACT OF THE DISCLOSURE

A frequency synthesizer of the kind in which a variable frequency oscillator is controlled by the output from comparing means which compares signals from the variable signal oscillator with a train of clock signals from which selectable combinations of signals have been eliminated so as to determine the control frequency of the oscillator.

A selector for eliminating the selectable combination of signals having a gate in the channel to which the train of clock signals is fed is provided. The selector also includes a cascade series of dividers of predetermined division factors fed with said train of clock signals, and a plurality of change-over switches each actuated by the output from a different divider. Each switch is fed with the output from the switch controlled by the next divider in the series and one or more other contacts to each of which a predetermined voltage can be selectively fed. The output from the switch actuated by the first divider in the series is applied to control the opening and closing of the gate. The total number of contacts of each switch is equal to the division factor of the divider actuating the same. The selector is arranged such that by differently selecting the other contacts of the switches to which the predetermined voltage is fed, the moment at which the gate is opened or closed may be differently selected so as to eliminate different selections of clock train signals.

This invention relates to frequency synthesizers, by which is meant, in this specification, devices adapted to provide any of a number of selectable output frequencies, spaced apart by desired frequency intervals, from an input frequency, usually termed a "clock" frequency. Frequency synthesizers are widely used in radio and similar very high frequency communication systems and the normal requirement is that the selectable output frequencies shall be accurately of pre-determined values.

Frequency synthesizers as at present in common use fall into one or other of two classes. In one the clock frequency is subjected to frequency multiplication, division, frequency filtering and similar processes so that the output signals are, in effect, the clock frequency after various frequency changing processes have been applied to it. This class of synthesizer is difficult and expensive to construct mainly because of the difficulty of preventing the production of spurious signals in the many frequency selective frequency changing and filtering circuits employed. Moreover, owing to the extensive filtering and consequent considerable numbers of inductances required, this class does not lend itself to embodiment in low weight small size equipments—a serious defect. In the second class of present day synthesizer the outputs are obtained from an independent, variable frequency oscillator the frequency of which is controlled to the required value. In this class of synthesizer as at present known and in general use frequency control of the oscillator is effected by a phase comparator which phase compares a frequency derived by dividing the oscillator output frequency with a frequency derived from the clock frequency. The divisor factor of the oscillator output frequency is varied to vary the output frequency. By phase comparing the two derived frequencies, there is obtained an error signal which is used to lock the oscillator to operate at a required output frequency. The second class of synthesizer, in the forms at present known, is difficult to design and make satisfactorily stable mainly because the oscillator output frequency has to be subjected to frequency division by a selected one of a large number of division factors which are both large in themselves and close together in value. Accordingly accurate locking of the oscillator requires an impractically high discrimination in the phase comparator. The present invention seeks to provide improved frequency synthesizers which shall be relatively simple and not present the foregoing defects.

Accordingly to a feature of this invention a frequency synthesizer comprises an oscillator which is frequency controlled by the integrated output from a subtractor to which are fed signals at the oscillation frequency and a train of clock signals from which selectable combinations of signals, selected to determine the controlled frequency of the oscillator, have been eliminated.

According to another feature of this invention a frequency synthesizer comprises a variable frequency oscillator, means for deriving from a clock frequency input a train of signals occurring at a frequency in fixed relation to the clock frequency, means for selecting from said train any of a plurality of different desired numbers of said signals occurring in a predetermined unit of time, means for comparing the selected number of said signals with the number of oscillations of the oscillator occurring in the same unit of time, and means for utilizing difference between the number of signals in the selected number with the number of oscillations to adjust said oscillator to a frequency at which said difference is substantially zero.

The train of signals may be derived from the clock frequency by frequency division or multiplication or it may be constituted by the clock frequency itself.

Preferably the selection of different desired numbers of the signals of the train of signals is achieved by selectably gating out different numbers of signals in the train. The gating out should be so effected that the remaining signals are as regular in occurrence as is practical in a gating selection system though, as will be appreciated, there will necessarily be some irregularities.

One form of selector for selecting different desired numbers of signals from the train of signals comprises a gate in a channel to which said train is fed, a cascade series of dividers of pre-determined division factors fed with said train and a plurality of change over switches each actuated by the output from a different divider, each switch having a contact fed with output from the switch controlled by the next divider in the series and one or more other contacts to each of which a pre-determined voltage can be selectively fed, the output from the switch actuated by the first divider in the series being applied to control the opening and closing of the gate and the total number of contacts of each switch being equal to the division factor of the divider actuating the same the whole arrangement being such that by differently selecting the said other contacts to which the pre-determined voltage is fed, the moments at which the gate is open or closed may be differently selected. Although switches and contacts are mentioned here it is to be understood that electronic switches without mechanically moving parts or actual contacts would in practice normally be used and the terms "switches" and "contacts" are employed herein to include their electronic equivalents.

Preferably means are provided for ensuring that pulses from the two signal channels leading to the means for comparing the selected number of signals of the train of signals with the number of oscillations occurring in the same unit of time shall not be applied to said comparing means simultaneously. Such means for preventing simultaneous application of pulses may include pulse correlation means.

A preferred embodiment includes means for applying a train of clock pulses to a gate, selection means for opening and closing said gate at different selectable combinations of moments to eliminate from said train different selectable combinations of pulses therein, an oscillator of variable frequency, a subtractor circuit, means for applying output from the gate to one input of said subtractor circuit and signals corresponding to oscillations from the oscillator to the other input of said subtractor circuit, means for integrating the output of said subtractor circuit and means for utilizing the integrated resultant for controlling the frequency of said oscillator to a value at which said integrated resultant is substantially zero.

The invention is illustrated in the accompanying drawing which is a simplified schematic diagram of one embodiment. In describing the drawing, which shows an arrangement which operates digitally to provide selectable output "spot" frequencies separated by 1 c./s., particular frequencies and factors of frequency division will be given but it is to be understood that these are by way of example only.

Referring to the drawing 1 is a crystal controlled or other highly stabilized source of frequency of 1 mc./s. This frequency is multiplied by a frequency multiplier 2 having a multiplication factor of 32 to provide a clock frequency of 32 mc./s. This frequency is fed to a pulse shaper or former 3 which feeds pulses at 32 mc./s. to one input of a pulse correlator 4 within the chain line block so referenced and one form of which will be described in some detail later. The pulse correlator has two output leads on which pulses must either occur simultaneously or on one only of the said output leads. Output pulses on one of these leads (the lower one in the figure), are fed through a controlled gate 5 as one input to a subtractor 6 which receives a second pulse input from the other output lead of the correlator 4 through a delay circuit 7. Accordingly pulses cannot occur simultaneously at the two inputs of the subtractor 6. The subtractor is of any known convenient counter type counting forward in response to pulses fed to one of its inputs and backwards in response to pulses fed to the other. It is because a normal subtractor of the counter type is liable to make a false count if pulses are fed to its two inputs simultaneously that the correlator and delay circuits are provided to prevent this happening. The gate 5 is controlled in such manner (to be described later) that the total number of pulses fed to the subtractor per unit of time is selectably variable, the number being changed by "shutting" the gate, for certain pulses of a regular train of pulses, so that those pulses are stopped at the gate. The pulse train passing the gate will, therefore, not consist entirely of regularly occurring pulses but gaps, dependent upon the particular selection made by the apparatus controlling the gate, will occur in the train. The design of the control apparatus controlling the gate is such that these irregularities will be as little as possible but they will occur and for this reason the subtractor should be so designed, in manner known per se, to have a certain amount of what is commonly termed "backlash" i.e. it should be so designed as not to respond to make a subtractive count until the number of pulses appearing at one of its inputs exceeds that appearing at its other inputs by a certain pre-determined amount. This excess amount—the "backlash" amount—is preferably adjusted by an adjustment which is gang-controlled with the control of the apparatus selecting the pulses to be eliminated by the gate, so that the amount of "backlash" is always well suited to the irregularities in the pulse train actually passed, at any time, by the gate 5. The means for providing "backlash" in the subtractor 6 and for adjusting the same, form per se no part of this invention and, being known to those skilled in the art, are not herein described or illustrated.

The output from the subtractor 6 is fed to an integrator 8 which can be of any of a variety of known types e.g. it may be an electric motor driven integrator or an integrator of the reversible binary divider type. It will be assumed that the integrator 8 is of the reversible binary divider type providing an output which is the integrated resultant of the input thereto. The integrated output from the integrator 8 is utilized to control a frequency control unit 9 exercising frequency control of an oscillator 10 in dependence upon the input to the said control unit 9. This control unit may be of any form known per se and is preferably of a form giving fine control and coarse control exercised over two leads from said unit 9 to the oscillator 10 though, for simplicity in drawing, only one such lead is shown in the figure. A preferred arrangement for use, where, as above described, the integrator is of the reversible binary divider type, is one in which the control unit exercises fine step-by-step control of the oscillator frequency by means of a varactor or the like forming part of a frequency-determining circuit of the oscillator if the frequency change required (at any time) to be effected by the control unit is relatively small e.g. if the required change is between 0.1 c./s. and 20 kc./s., said control unit exercising coarse step-by-step control of the oscillator frequency by switching condensers in and out of a frequency-determining circuit of the oscillator if the frequency change required (at any time) to be effected by the control unit is relatively large e.g. between 10 kc./s. and 1 mc./s. It will be observed that, with these particular figures, the ranges in which fine control and coarse control are exercised overlap a little. This is a practical arrangement.

Output from the oscillator 10 is taken off for utilization at terminal 11 and is also fed back via a pulse former or shaped 12 to constitute one of the inputs to the pulse correlator 4.

The control of the gate 5 will now be described. Input to this gate is branched off to a number of cascaded chains of cascaded frequency dividers. The first chain comprises a series of divide-by-two dividers 13. In the particular arrangement illustrated, if the input frequency to the first of these dividers is, as assumed, 32 mc./s., the output from the first of these dividers will be 16 mc./s., the output from the next will be 8 mc./s., the output from the next will be 4 mc./s. . . . and so on. The number of dividers 13 in the first chain is such as to produce a final output of 1 mc./s. Each of these dividers has two outputs one of which is fed to the next divider in the chain and the other of which is employed to operate a two position switch 14 at the output frequency of the divider considered. In practice the switches 14 would be electronic switches but, for simplicity of drawing, they are indicated as though they were ordinary relay switches operated, at the appropriate frequencies, by relays 15. In one position of each switch it receives input from the switch actuated at the frequency of the next divider in the chain of dividers 13. In the other position of each switch it receives input of a potential determined by whether or not a manually operable switch 16 is closed, said switch 16 being inserted between a contact of the appropriate switch 14 and a potential source. Thus, in the illustrated arrangement, if the uppermost switch 16 is closed the switch 14, when in its right hand position, will supply to the gate 5 a positive potential which is such that said gate will be open.

The output from the last of the dividers 13 in the first chain, which output is, in the present example, 1 mc./s., is fed to a second chain of cascaded pairs of dividers $17^1$, $18^1$, $17^2$, $18^2$ . . . and so on to $17^n$, $18^n$, *n* being chosen in dependence upon the extent of division required. The dividers $17^1$, $17^2$ . . . $17^n$ each divide by 2 and the dividers $18^1$, $18^2$ . . . $18^n$ each divide by 5. Each pair thus produces, together, a division by 10 and if the input to the divider $17^1$ is, as above stated, 1 mc./s., the output from the divider $18^1$ will be 100 kc./s. The number of pairs is assumed, in the present case, to be such that the output from the last divide-by-five divider $18^n$ is 1 c./s. Each divide-by-two divider actuates a two position switch 14 shown, like each of the switches 14 already described, as though it were a relay switch operated by a relay 15 each such two position switch having, as before, a contact connectable through a manually operable switch 16 to the above mentioned positive potential source. One contact of each of these two-position switches is connected to the armature of a five position switch 17 actuated by the next following divide-by-five divider $18^1$, $18^2$ . . . $18^n$. These five position switches would normally be electronic switches but again, for simplicity of drawing, they are shown as though they were mechanical switches actuated by relays 155. The arrangement is such that each pulse in the output from any divide-by-five divider $18^1$, $18^2$ . . . $18^n$ actuates the five position switch driven thereby to move its armature round by one contact. Each five position switch has its armature connected to one contact of the next preceding two-position switch 14, one of its five contacts connected armature of the next following two position switch 14 (if any) and its remaining contacts each connected through a switch 16 to the positive potention source already mentioned. It will be seen that, by choosing different combinations of switches 16 to be opened, different combinations of pulses from the 32 mc./s. train of pulses fed to the gate 5 will find the gate shut when they arrive there and will accordingly be omitted from the pulse train fed from gate 5 to the subtractor 6. Since the integrated subtractor output controls the frequency of the oscillator 10 to a value at which the difference between the number of pulses fed, per unit of time, to the subtractor 6 from the delay unit 7 and from the gate 5, is zero, the said oscillator 10 is automatically adjusted to a frequency determined by the number of pulses passing the gate 5 in that unit of time despite that the train of pulses passing the gate is not composed entirely of regularly recurring pulses, there being moments when pulses are omitted. By changing the pulses omitted—as is done by choosing different combinations of switches 16 to be opened—the frequency of the oscillator 10 is kept at a desired frequency selected by selecting the switches 16 to be opened. These switches are controlled by control knobs (not shown) which, in different settings, choose different frequencies. Thus the switches 16 which are in circuit with the switches 14 actuated by the dividers 13 could be selectively controlled by a knob having a pointer moving over a scale marked in megacycles; the switches 16 which are in circuit with the switches 14 and 17 actuated by the dividers $17^1$, $18^1$ could be selectively controlled by a knob having a pointer moving over a scale marked in hundreds of kilocycles; . . . and so on. Such an arrangement is conventionally indicated in the figure by the brackets the adjoining legends "1 mc./s. selection"; "100 kc./s. selection"; "10 kc./s. selection" . . . and so on down to 1 c./s. selection.

As a matter of practical convenience it is strongly desirable, though not theoretically essential, to provide the oscillator 10 with a measure of coarse manual frequency adjustment—to the nearest 1 mc./s. for example—so that it is adjusted very approximately to the desired selected frequency by a control ganged with the control for certain of the switches 16. This is conventionally indicated in the figure by the chain lines 19 which indicate the gang control of coarse tuning of the oscillator 10 with the control selection of the switches 16 effecting 1 mc./s. selection.

It now remains to describe the pulse correlator 4 illustrated. This includes two "flip-flops" or bistable devices 41, 42 each having two stable states indicated conventionally by the legends 0 and 1 marked thereon. If device 42 is in state 0 an input pulse from pulse shaper 3 changes it into state 1 and a pulse is fed through the pulse shaper 43 to the delay unit 7. At the same time (if one neglects, as is done here, ordinary circuit delays) a pulse also appears at the input side of gate 5. If device 41 is in state 0, a pulse fed thereto from the pulse shaper 12 changes its state to state 1 and this causes a pulse to be fed through an electronic switch 44 (if closed) and a pulse former or shaper 45 to the 0 state input of device 42. Switch 44 is controlled by the 0 state output of device 42 in such manner as to be closed only when said device 42 is in state 1. Accordingly a pulse output from device 41 fed through switch 44 and shaper 45 to device 42 changes that device back to state 0, thus putting it in condition to give an output pulse when the next input pulse is fed to it from shaper 3. At the same time the pulse from device 41 is fed through switch 44 (when closed) and shaper 45 to the 0 state input of said device 41 rendering this device ready to give an output pulse when the next input pulse is fed thereto from shaper 12. Thus any pulse from shaper 3 will produce simultaneous input pulses at delay 7 and gate 5 if, at the time of arrival of said pulse, device 42 is in state 0 but if at that time said device is in state 1, a pulse is fed to gate 5 only and not to delay unit 7. Any pulse from shaper 12 will change device 41 to state 1 but this is ineffective unless switch 44 is closed. It will be seen therefore that the operation of the pulse correlator 4 is such that pulses from shaper 12 produce input pulses at the delay unit 7 and pulses from shaper 3 produce input pulses at the gate 5 and that when pulses arrive from both shapers they are necessarily simultaneous at the inputs to units 7 and 5. Of course, it is a requirement that the total number of pulses from shaper 3 shall exceed that from shaper 12 but the design of the apparatus as a whole is such as to satisfy this requirement. By inserting the delay unit 7, which need only have a short delay, it is ensured that despite the fact that pulses from shaper 12 will "slide across" pulses from shaper 3 in time, simultaneous pulses such as could cause false operation of the subtractor 6, cannot occur on the two inputs thereto because pulses which are simultaneous at the inputs to units 5 and 7 cannot be simultaneous at the two inputs of unit 6.

The invention is obviously not limited to the particular arrangement described and illustrated and many modifications are possible. Thus, for example, the illustrated embodiment above described operates digitally with a counter as the subtractor and an integrator of the reversible binary divider type. Digital operation is obviously not a necessity of the invention. Again the pulse correlator is shown preceding the gate 5 and the delay unit 7 but, as will be apparent, it is possible to design a suitable pulse correlator which will prevent the simultaneous application of pulses to the subtractor if inserted between said subtractor and the units 5 and 7.

I claim:

1. A frequency synthesizer comprising a variable frequency oscillator; means for producing a train of clock frequency signals; a selector for selecting different desired numbers of signals from the train of signals occurring in a predetermined unit of time, the selector comprising a gate in a channel to which said train is fed, a cascade series of dividers of predetermined division factors fed with said train and a plurality of changeover switches each actuated by the output from a different divider, each switch having a contact fed with the output from the switch controlled by the next divider in the series, and one or more other contacts to each of which a predetermined voltage can be selectively fed, the output from the switch actuated by the first divider in the series being applied to control the opening and closing of the gate and the total number of contacts of each switch being equal to the division factor of the divider actuating the same, whereby differently selecting the said other contacts to which the predetermined voltage is fed determines the moments at which the gate is opened or closed; means for comparing the selected number of said clock signals from the selector with the number of oscillations from said variable frequency oscillator occurring in the same unit of time; and means for utilizing the difference between the number of signals in the selected number with the number of oscillations to adjust said oscillator to a frequency at which said difference is substantially zero.

2. A frequency synthesizer as claimed in claim 1 wherein shaping means are provided in the path from the variable frequency oscillator output to said comparing means to produce pulses at the frequency of said oscillator for feeding to said comparing means.

3. A frequency synthesizer as claimed in claim 2 wherein means are provided for insuring the pulses fed to said comparing means, for comparison, shall not be applied to said comparing means simultaneously.

4. A frequency synthesizer as claimed in claim 3 wherein said means for preventing simultaneous application of pulses may include pulse correlation means.

5. A frequency synthesizer according to claim 1 wherein said comparing means comprises a subtractor circuit, the output of which is fed to integrating means for integrating the output of said subtractor circuit and means are provided for utilizing the integrated resultant controlling the frequency of said variable oscillator to a value at which said integrated resultant is substantially zero.

References Cited

UNITED STATES PATENTS

| | | | |
|---|---|---|---|
| 3,165,706 | 1/1965 | Sarratt | 331—18 |
| 3,297,953 | 1/1967 | Colton | 331—18 |

ROY LAKE, *Primary Examiner.*

S. H. GRIMM, *Assistant Examiner.*